US 9,317,619 B2

(12) United States Patent
    Adams

(10) Patent No.:     US 9,317,619 B2
(45) Date of Patent:     Apr. 19, 2016

(54) CHANNEL IDENTIFIER SYMBOL CODE TWO DIMENSIONAL BARCODE

(75) Inventor: Mark Shelby Adams, Duluth, GA (US)

(73) Assignee: Cisco Technology, Inc., San Jose, CA (US)

( * ) Notice: Subject to any disclaimer, the term of this patent is extended or adjusted under 35 U.S.C. 154(b) by 270 days.

(21) Appl. No.: 13/280,534

(22) Filed: Oct. 25, 2011

(65) Prior Publication Data

US 2013/0098982 A1      Apr. 25, 2013

(51) Int. Cl.
    *H04N 21/41*      (2011.01)
    *H04N 21/47*      (2011.01)
    *H04N 21/475*     (2011.01)
    *G06F 17/30*      (2006.01)

(52) U.S. Cl.
    CPC ...... *G06F 17/30879* (2013.01); *H04N 21/4126* (2013.01); *H04N 21/4758* (2013.01); *G06Q 2230/00* (2013.04)

(58) Field of Classification Search
    CPC .......... H04N 21/4307; H04N 21/4126; H04N 21/4147; H04N 21/41407; H04N 21/42219; H04N 21/4227; H04N 21/4325; H04N 21/433; H04N 21/4331; H04N 21/4333; H04N 21/435; H04N 21/8146; H04N 21/4524; H04N 21/432; H04N 21/4353; H04N 21/44004; H04N 21/44008; H04N 21/4758; G06Q 2230/00; G06F 17/30879

USPC .......... 235/375, 454; 725/35, 53, 86, 87, 100, 725/112, 113, 139–141; 705/14.4, 14.49, 705/14.51, 14.64, 14.66, 14.67, 14.72

See application file for complete search history.

(56) References Cited

U.S. PATENT DOCUMENTS

| | | | | |
|---|---|---|---|---|
| 7,387,250 B2* | 6/2008 | Muni | | 235/462.01 |
| 8,386,339 B2* | 2/2013 | Minnick et al. | | 705/26.81 |
| 8,408,466 B2* | 4/2013 | Gratton | | 235/462.1 |
| 8,439,257 B2* | 5/2013 | Beals et al. | | 235/435 |
| 8,443,407 B2* | 5/2013 | Gaede et al. | | 725/88 |
| 2003/0229542 A1* | 12/2003 | Morrisroe | | 705/14 |
| 2004/0268399 A1* | 12/2004 | Asakawa | | 725/89 |
| 2007/0016936 A1* | 1/2007 | Okada et al. | | 725/136 |
| 2008/0093460 A1* | 4/2008 | Frantz et al. | | 235/462.46 |
| 2008/0107392 A1* | 5/2008 | Grannan et al. | | 386/83 |
| 2009/0029725 A1* | 1/2009 | Gerard Kindberg | | 455/466 |
| 2009/0049475 A1* | 2/2009 | Green et al. | | 725/44 |
| 2009/0083808 A1* | 3/2009 | Morrison | | 725/87 |
| 2010/0219240 A1* | 9/2010 | Yang et al. | | 235/375 |
| 2011/0306368 A1* | 12/2011 | Mccarthy | | 455/466 |
| 2012/0137318 A1* | 5/2012 | Kilaru et al. | | 725/14 |
| 2012/0151524 A1* | 6/2012 | Kilaru et al. | | 725/35 |
| 2012/0155838 A1* | 6/2012 | Gerhards et al. | | 386/291 |
| 2012/0159563 A1* | 6/2012 | Gomez et al. | | 725/132 |
| 2012/0222055 A1* | 8/2012 | Schaefer et al. | | 725/5 |

* cited by examiner

*Primary Examiner* — Michael G Lee
*Assistant Examiner* — Suezu Ellis
(74) *Attorney, Agent, or Firm* — Merchant & Gould P.C.

(57) ABSTRACT

Content information may be provided. First, an indicia may be captured from displayed content and data may be extracted from the captured indicia. Next, the extracted data may be transmitted and information corresponding to the displayed content may be received, in response to the transmitted, extracted data. The received information may then be displayed.

14 Claims, 4 Drawing Sheets

CHANNEL IDENTIFIER SYMBOL CODE TWO DIMENSIONAL BARCODE

BACKGROUND

A barcode is an optical machine-readable representation of data that shows data about the object to which it attaches. Originally, barcodes represented data by varying the widths and spacings of parallel lines. These bar codes may be referred to as linear or one dimensional (i.e. 1D). Later, bar codes evolved into rectangles, dots, hexagons, and other geometric patterns in two dimensions (i.e. 2D). Although 2D barcodes use a variety of symbols, they are generally referred to as barcodes as well.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
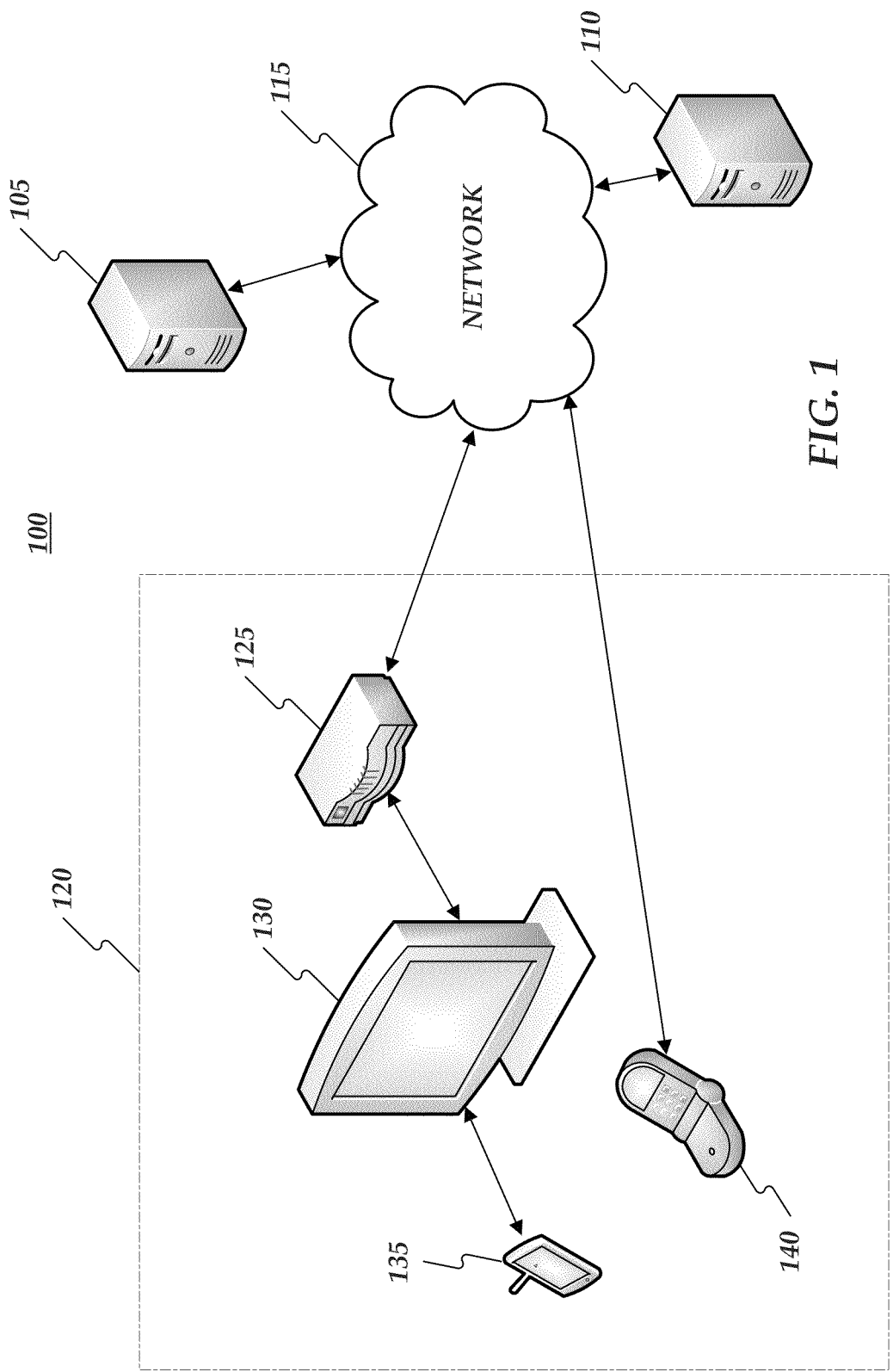
FIG. 1 shows an operating environment including a computing device.

Content information may be provided. First, an indicia may be captured from displayed content and data may be extracted from the captured indicia. Next, the extracted data may be transmitted and information corresponding to the displayed content may be received, in response to the transmitted, extracted data. The received information may then be displayed.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Consistent with embodiments of the disclosure, content information may be received. While content is being displayed on a display, an indicia (e.g. a low-resolution 2D barcode) may appear as an overlay to the content for a predetermined time period on the display. The indicia may appear in response to a user initiated input (e.g. the user pressing a button on a remote control.) The user may launch an application on a mobile device that uses a camera to capture an image that includes the indicia. The application may then extract data from the image of the indicia. This data may be used by the application to obtain content information corresponding to the displayed content. For example, the application may use the data to query a database over the internet for the content information corresponding to the displayed content. The content information may comprise, but is not limited to, a voting ballot corresponding to the displayed content, an advertisement, instructions on how to purchase an item corresponding to the advertisement, and information on how to order on demand content.

Embodiments may work with recorded content as well. For example, the user may be watching recorded content from a digital video recorder (DVR). While watching the recorded content, an indicia may be displayed. An image of the indicia may be captured and data may be extracted from the captured image as described above. Because the extracted data from the indicia's image may include origin information, the user may be directed to content information corresponding uniquely to the recorded content's original airing. The origin information may comprise, but not limited to, an offset from start of the displayed recorded content, a timestamp of the air date on which the displayed recorded content was recorded, and channel information of the displayed recorded content. Consequently, the user may be directed to content information unique to the airing date of the displayed recorded content.

FIG. 1 is a block diagram of an operating environment 100. As shown in FIG. 1, operating environment 100 may include a web server 105, a content provider head end 110, a network 115, and customer premises equipment (CPE) 120. Web server 105 may deliver web pages in response to requests from clients (e.g. CPE 120.) In other words, web server 105 may deliver, for example, hypertext markup language (HTML) documents and any additional content that may be included by a document, such as images, style sheets, and scripts. Also, web server 105 may host web sites, store data storage, and run enterprise applications.

Content provider head end 110 may receive television signals and distribute them over network 115 to CPE 120. In addition, content provider head end 110 may distribute on demand content as well as simulcast and unicast content to CPE 120. Network 115 may comprise any type of network capable of communicating data comprising, for example, video and audio content. For example, network 115 may comprise a local area network (LAN) or wide area network (WAN) such as the Internet.

CPE 120 may comprise any device or devices capable of receiving and displaying content. As shown in FIG. 1, CPE 120 may comprise a content device 125, a display 130, a remote control 135, and a computing device 140. Content device 125 may comprise, but is not limited to, a set-top box, a digital video recorder, a cable modem, or a personal computer. Display 130 may comprise, for example, a high definition television, a flat screen display device, or the display of another computing device such as a desk top personal computer, a tablet device, or a mobile device. Remote control 135 may comprise any device capable of interfacing with display 130 to cause display 130 to perform a desired function.

Content device 125 may be used to receive content over network 115 from web server 105 or from content provider head end 110. The received content may comprise simulcast and unicast television content as well as on demand content. The aforementioned are examples and the received content may comprise any type of content. Once the content has been received, content device 125 may cause the content to be displayed on display 130. After the content is displayed on display 130, remote control 135 may be used, for example, to allow a user to select desired content, to interact with the displayed content, or to cause display 130 to perform a desired function. In other embodiments, the content may be received directly by display 130 from network 115 without using content device 125.

Computing device 140 may comprise, but is not limited to, a mobile device, a tablet device, a smart phone, a telephone, or a personal computer. The aforementioned are examples and computing device 140 may comprise any type of computing device. A camera may be utilized by computing device 140. The camera may be built-in to computing device 140 or it may be external. Computing device 140 may capture images using the camera for processing as described in greater detail below. Moreover, computing device 140 may have the ability to interface with web server 105 over network 115. For example, computing device 140 may receive, from web server 105, hypertext markup language (HTML) documents and any additional content that may be included by a document, such as images, style sheets, and scripts. Computing device 140 may interface with web sites hosted on web server 105, store data on web server 105, and may run enterprise applications on web server 105.

Figure 2:
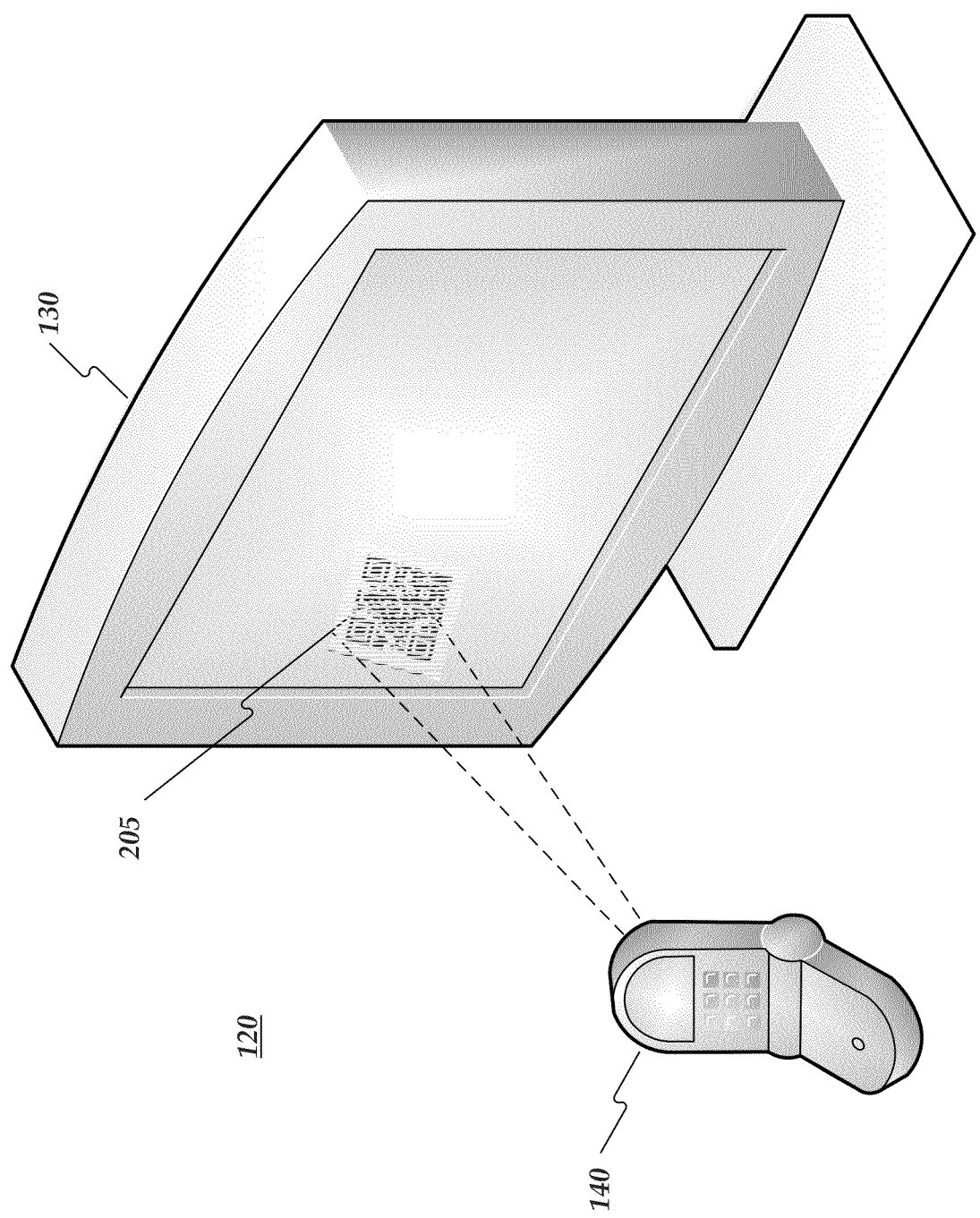
FIG. 2 shows customer service equipment.

FIG. 2 shows CPE 120 in more detail. As shown in FIG. 2, content may be displayed on display 130. The displayed content may include an indicia 205. Consistent with embodiments of the disclosure, computing device 140 may be used to capture an image of the displayed content including indicia 205. Indicia 205 may comprise an optical, machine-readable representation of data. For example, indicia 205 may comprise a one-dimensional bar code, a two-dimensional bar code, a MaxiCode, or a high capacity color barcode. The aforementioned are examples and indicia 205 may comprise any type of optical, machine-readable data representation.

Figure 3:
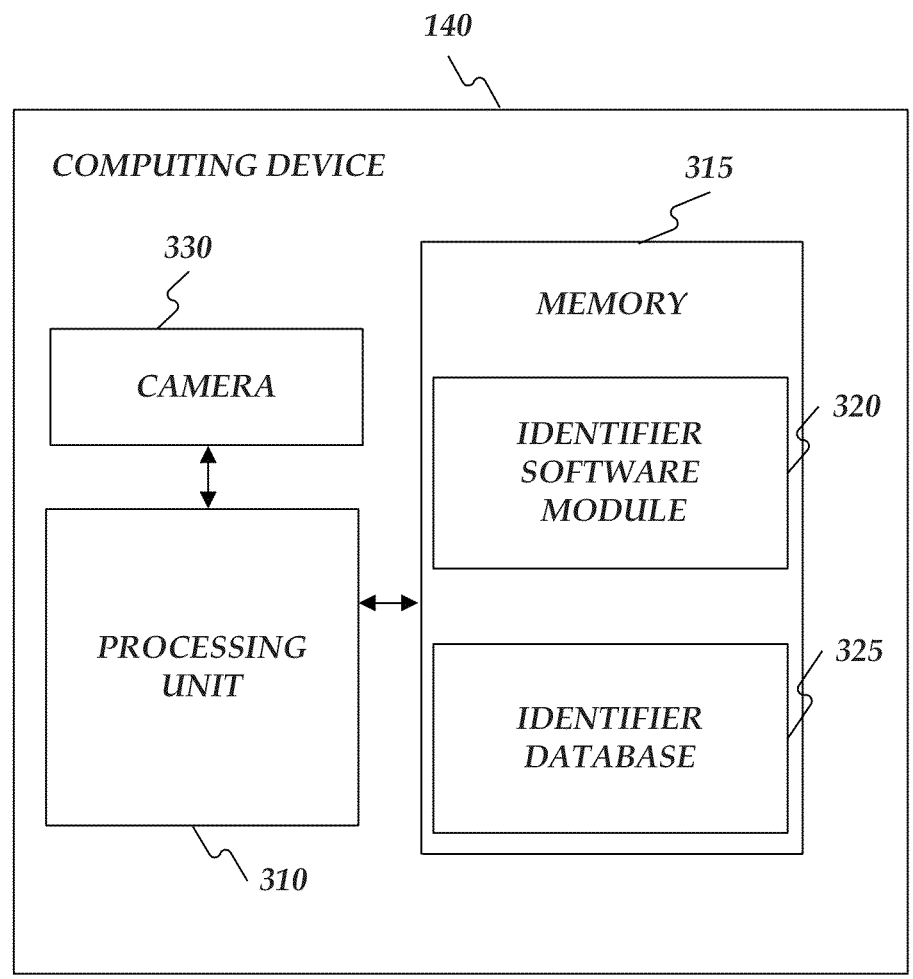
FIG. 3 shows the computing device.

FIG. 3 shows computing device 140 in more detail. As shown in FIG. 3, computing device 140 may include a processing unit 310 and a memory unit 315. Memory unit 315 may include an identifier software module 320 and an identifier database 325. In addition, computing device 140 may comprise a camera 330 that may capture images and store them in identifier database 325 under the control of processing unit 310. While executing on processing unit 310, identifier software module 320 may perform processes for providing content information, including for example, one or more stages from method 400 described below with respect to FIG. 4.

Computing device 140 ("the processor") may be implemented using a tablet device, a mobile device, a smart phone, a telephone, a remote control device, a set-top box, a digital video recorder, a cable modem, a personal computer, a network computer, a mainframe, or other similar microcomputer-based device. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and the processor may comprise other systems or devices.

Figure 4:
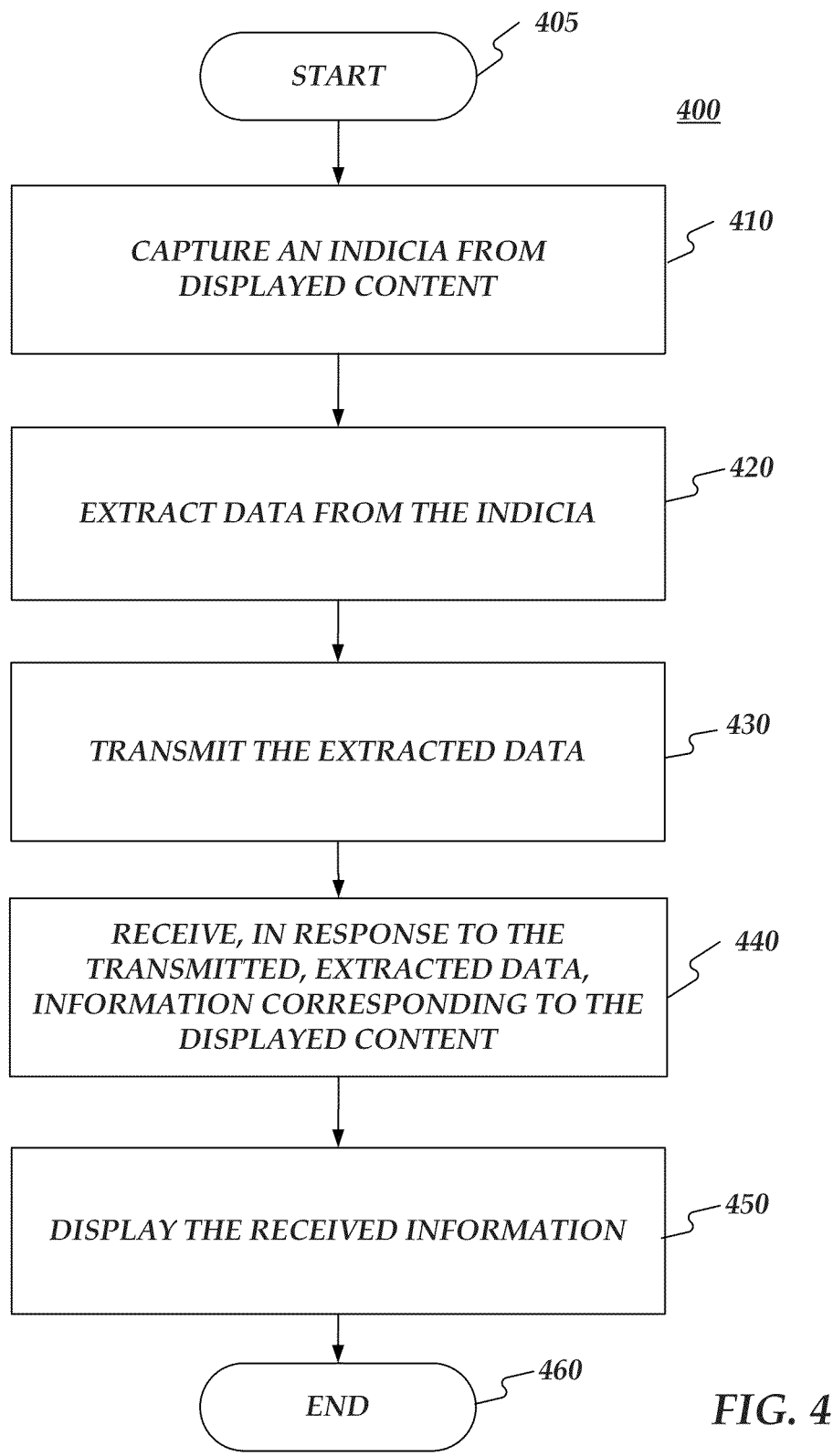
FIG. 4 is a flow chart of a method for providing content information.

FIG. 4 is a flow chart setting forth the general stages involved in a method 400 consistent with an embodiment of the disclosure for receiving content information. Method 400 may be implemented using a computing device 140 as described in more detail above with respect to FIG. 2. Ways to implement the stages of method 400 will be described in greater detail below.

Method 400 may begin at starting block 405 and proceed to stage 410 where computing device 140 may capture indicia 205 from displayed content. For example, while content is being displayed on display 130, indicia 205 (e.g. a low-resolution 2D barcode) corresponding to the displayed content may appear as an overlay to the displayed content for a predetermined time period on display 130. The content may be provided, for example, from content provider front end 110, web server 105, or from content device 125. The content may be broadcast television, unicast television, video on demand, or may be content provided from a DVR (e.g. content device 125.) Indicia 205 may appear on the content in response to a user initiated input (e.g. the user pressing a button on remote control 135.) The user may be given the option to block any personal information from appearing in indicia 205. For example, the user may be given the option of blocking data identifying the user (e.g. an internet protocol (IP) or media access control (MAC) address of content device 125).

As stated above, indicia 205 may comprise an optical, machine-readable representation of the data. In order to capture displayed indicia 205, the user may launch an application on computing device 140 that may use camera 330 to capture an image that may include indicia 205. In other words, the user may first cause indicia 205 to appear and may then take a picture of indicia 205 within the aforementioned application in order to capture the image of indicia 205.

In other embodiments, the user may launch the application that may cause camera 330 to take a movie. Once camera 330 is taking the movie, the user may press a button on remote control 135 to cause indicia 205 to appear. After camera 330 has taken the movie that includes indicia 205, the application may determine that the image of indicia 205 is in the movie and may cause the camera to stop taking the movie. In this way, the indicia 205 may only need to appear for a brief predetermined time period and then disappear. This predetermined time period may be so short that a person viewing the displayed content may not even notice that indicia 205 ever appeared.

From stage 410, where computing device 140 captures indicia 205 from the displayed content, method 400 may advance to stage 420 where computing device 140 may extract data from indicia 205. For example, computing device 140 may parse the obtained (e.g. captured) image of indicia 205 and extract the data from the optical, machine-readable representation of the data in indicia 205. The extracted data may comprise, but is not limited to, any one or more of the following: i) data identifying a television channel that the displayed content is presented from; ii) a title of the content; iii) a uniform resource locator (URL) corresponding to the content; iv) data identifying the content provider; v) data identifying the user (e.g. an internet protocol (IP) or media access control (MAC) address of content device 125); vi) an offset from start of the content; and vii) a timestamp of the original air date of the content. Consequently, the extracted data may encode content viewing information in a graphical representation.

As stated above, the content may be provided from a DVR (e.g. content device 125. In this embodiment, when the content was saved to the DVR, the DVR may have saved the original-air-date of the content as part of its metadata in its stored video recordings. The DVR may have a time-shift-buffer feature. The time-shift-buffer DVR feature may track an offset-from-start-of-the-content at the buffer point currently displayed to provide this data for indicia 205. Accordingly, data (e.g. corresponding to a date) extracted from indicia 205 may be time reference adjusted for recoded and DVR shifted content. In other words, the data extracted from indicia 205 may include a date and time of when the indicia 205 was displayed in the content that was recorded and save to the DVR. Because the same program may be aired at different times, indicia 205 may include a date unique to the airing of the content from which the recording was made. Accordingly, embodiments of the disclosure may provide a network solution for linking TV ads to time, provider, and channel corresponding to the content.

Once computing device 140 extracts the data from indicia 205 in stage 420, method 400 may continue to stage 430 where computing device 140 may transmit the extracted data. For example, computing device 140 may transmit the extracted data to web server 105 over network 115. In response to the extracted data received from computing device 140, web server 105 may fulfill a request in response to the data and produce information corresponding to the displayed content. For example, the information corresponding to the displayed content may comprise a voting ballot corresponding to the displayed content or information on how to order on demand content. Furthermore, the information corresponding to the displayed content may comprise an advertisement and/or instructions on how to purchase an item corresponding to the advertisement.

Because the extracted data may be time reference adjusted for recoded and DVR shifted content, the information corresponding to the displayed content may be the same each time the content is displayed from a DVR. For example, the information corresponding to the displayed content may be different if the same content is shown on a different channel or at a different time. However, anytime the content is played back from a DVR, the information corresponding to the displayed content may be the same and may be unique to the particular recorded showing of the content.

From stage 430, where computing device 140 transmits the extracted data, method 400 may advance to stage 440 where computing device 140 may receive, in response to the transmitted, extracted data, information corresponding to the displayed content. For example, once web server 105 has produced the information corresponding to the displayed content, web server 105 may transmit the information corresponding to the displayed content to computing device 140 over network 115.

After computing device 140 receives the information corresponding to the displayed content in stage 440, method 400 may proceed to stage 450 where computing device 140 may display the received information. For example, computing device 140 may display the information on a screen corresponding to computing device 140. Once on the screen, the user may interact with the received information. For example, the displayed content may comprise a talent show and the received information may comprise a voting ballot. From computing device 140's screen, the user may vote on a contestant in the talent show and transmit the executed voting ballot back to web server 105 for tallying. As another example, the displayed content may comprise a website for a product being advertised in the content (e.g. a home shopping show.) From computing device 140's screen, the user may order a product and transmit a product order back to web server 105 for processing. As yet another example, the displayed content may comprise a movie or television show. From computing device 140's screen, the user may read the received information comprising, for example, biographies for actors in the show, the movie's plot, or any other detailed information corresponding to the movie or television show. Once computing device 140 displays the received information in stage 450, method 400 may then end at stage 460.

An embodiment may comprise a system for receiving content information. The system may comprise a memory storage and a processing unit coupled to the memory storage. The processing unit may be operative to capture an indicia from displayed content and extract data from the indicia. In addition, the processing unit may be operative to transmit the extracted data and to receive, in response to the transmitted, extracted data, information corresponding to the displayed content. Moreover, the processing unit may be operative to display the received information.

Another embodiment may comprise a system for providing content information. The system may comprise a memory storage and a processing unit coupled to the memory storage. The processing unit may be operative to extract data from an indicia comprising an optical, machine-readable representation of the data displayed in content. Moreover, the processing unit may be operative to receive information corresponding to the extracted data and to display the received information.

Yet another embodiment may comprise a system for receiving content information. The system may comprise a memory storage and a processing unit coupled to the memory storage. The processing unit may be operative to receive, from a mobile device, data extracted by the mobile device from an indicia displayed in content. Furthermore, the processing unit may be operative to search for information corresponding to the received data and to transmit the information to the mobile device.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    displaying, on a display, content provided from a digital video recorder (DVR);
    displaying, on the display, an indicia in response to a user initiated input comprising pressing of a button on a remote control device, the indicia being displayed for a predetermined time period as an overlay to the displayed content;
    capturing, by a mobile device, the indicia from the displayed content;
    extracting, by the mobile device, data from the indicia, wherein extracting the data from the indicia comprises extracting:
        an offset from start time of the displayed content, wherein the offset is tracked on a time shift buffer located on the DVR, and
        a broadcasting date for the displayed content that was recorded on the DVR;
    transmitting, by the mobile device, the extracted data to a server;
    receiving, by the mobile device from the server in response to transmitting the extracted data, information corresponding to the displayed content, wherein receiving the information comprises receiving information unique to the broadcasting date of the displayed content and comprising a voting ballot corresponding to the displayed content;
    displaying, on the mobile device, the voting ballot;
    executing the voting ballot by a user on the mobile device; and
    transmitting, from the mobile device, the executed voting ballot to the server.

2. The method of claim 1, wherein the displayed content from the DVR is recorded from a broadcast television.

3. The method of claim 1, wherein capturing the indicia comprises using a camera on the mobile device to obtain an image of the indicia in the displayed content, the content being displayed on the display separate from the mobile device.

4. The method of claim 3, wherein extracting the data from the indicia comprises processing the obtained image to extract the data from the indicia.

5. The method of claim 1, wherein capturing the indicia comprises capturing an optical, machine-readable representation of the data.

6. The method of claim 1, wherein capturing the indicia comprises capturing a bar code.

7. The method of claim 1, wherein transmitting the extracted data comprises transmitting the extracted data to a web server over a network.

8. The method of claim 1, wherein receiving the information comprises receiving information identifying the user of content device.

9. An apparatus comprising:
    a memory storage; and
    a processing unit coupled to the memory storage, wherein the processing unit is operative to:
        extract data from an indicia comprising an optical, machine-readable representation of the data displayed in content provided from a digital video recorder (DVR), wherein the indicia is displayed in response to a user initiated input comprising pressing of a button on a remote control device, wherein the indicia is displayed for a predetermined time period as an overlay to the displayed content, wherein the processing unit being operative to extract the data from the indicia comprises the processing unit being operative to extract:
            an offset from a start time of the displayed content, wherein the offset is tracked on a time shift buffer located on the DVR, and
            a broadcasting date for the displayed content that was recorded on the DVR;
        receive information corresponding to the extracted data, wherein the processing unit being operative to receive the information comprises the processing device operative to receive information unique to the broadcasting date of the displayed content and comprising a voting ballot corresponding to the displayed content;
        display the voting ballot;
        execute the voting ballot based on user initiated input; and
        transmit the executed voting ballot to a server.

10. The apparatus of claim 9, wherein the processing unit is further operative to use a camera on a mobile device to obtain an image of the indicia in the content, the content being displayed on a display separate from the mobile device.

11. A method comprising:
    receiving, from a mobile device, data extracted by the mobile device from an indicia displayed in content provided from a digital video recorder (DVR), wherein the indicia is displayed in response to a user initiated input comprising pressing of a button on a remote control device, wherein the indicia is displayed for a predetermined time period as an overlay to the displayed content, and wherein the data extracted from the indicia comprises:
- an offset from a start time of the displayed content, wherein the offset is tracked on a time shift buffer located on the DVR, and
- a broadcasting date for the displayed content that was recorded on the DVR;

searching for information corresponding to the received data, wherein searching for the information comprises searching for information unique to the broadcasting date of the displayed content and comprising a voting ballot corresponding to the displayed content;

transmitting the voting ballot to the mobile device;

receiving, from the mobile device, an executed version of the voting ballot, the voting ballot being executed based on user initiated input; and using the executed version of the voting ballot in determining an outcome of an election corresponding to the displayed content.

12. The method of claim 11, wherein searching for the information corresponding to the received data comprises searching for the information based on the offset from the start time of the displayed content and the broadcasting date of the displayed content.

13. An apparatus comprising:
a memory storage; and
a processing unit coupled to the memory storage, wherein the processing unit is operative to:

receive, from a mobile device, data extracted by the mobile device from an indicia displayed in content provided from a digital video recorder (DVR), wherein the indicia is displayed in response to a user initiated input by pressing of a button on a remote control device associated with the DVR, wherein the indicia is displayed for a predetermined time period as an overlay to the displayed content, and wherein the data extracted from the indicia comprises:
- an offset from a start time of the displayed content, and wherein the offset is tracked on a time shift buffer located on the DVR, and
- a broadcasting date for the displayed content that was recorded on the DVR;

search for information corresponding to the received data, wherein the processing unit being operative to search for the information comprises the processing device operative to search information unique to the broadcasting date of the displayed content and a voting ballot corresponding to the displayed content;

transmit the voting ballot to the mobile device;

receive, from the mobile device, an executed version of the voting ballot, the voting ballot being executed based on user initiated input; and use the executed version of the voting ballot in determining an outcome of an election corresponding to the displayed content.

14. The apparatus of claim 13, wherein the processing unit being operative to search for the information corresponding to the received data comprises the processing unit being operative to search for the information based on the offset from the start time of the content and the broadcasting date of the content.

* * * * *